US008737345B2

(12) United States Patent
Hogenmueller et al.

(10) Patent No.: US 8,737,345 B2
(45) Date of Patent: May 27, 2014

(54) DYNAMIC FUNCTION SLOT ASSIGNMENT IN INTRA-VEHICULAR WIRELESS NETWORKS

(75) Inventors: Thomas Alfons Hogenmueller, Sunnyvale, CA (US); Vivek Jain, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 1069 days.

(21) Appl. No.: 12/469,154

(22) Filed: May 20, 2009

(65) Prior Publication Data

US 2010/0296478 A1 Nov. 25, 2010

(51) Int. Cl.
*H04W 72/04* (2009.01)

(52) U.S. Cl.
USPC ........................................................ 370/330

(58) Field of Classification Search
USPC .................. 370/340, 445, 458, 442, 444, 330
See application file for complete search history.

(56) References Cited

U.S. PATENT DOCUMENTS

| | | | | |
|---|---|---|---|---|
| 5,991,282 | A * | 11/1999 | Langlet et al. | 370/332 |
| 6,310,866 | B1 * | 10/2001 | Kronestedt et al. | 370/330 |
| 7,016,395 | B2 * | 3/2006 | Watanabe et al. | 375/132 |
| 7,085,564 | B2 * | 8/2006 | Nishiyama et al. | 455/432.1 |
| 8,238,313 | B2 * | 8/2012 | Maltsev et al. | 370/337 |
| 2002/0058493 | A1* | 5/2002 | Ikeda et al. | 455/403 |
| 2005/0058084 | A1* | 3/2005 | Hester et al. | 370/254 |
| 2006/0170565 | A1* | 8/2006 | Husak et al. | 340/825.49 |
| 2007/0019569 | A1 | 1/2007 | Park et al. | |
| 2007/0081548 | A1* | 4/2007 | Jiang | 370/442 |
| 2008/0054618 | A1* | 3/2008 | Ishii | 280/807 |
| 2008/0096573 | A1* | 4/2008 | Chu | 455/450 |
| 2008/0246338 | A1* | 10/2008 | Donnelly et al. | 307/54 |
| 2008/0298299 | A1* | 12/2008 | Thesling | 370/316 |
| 2009/0213801 | A1* | 8/2009 | Bejerano et al. | 370/329 |
| 2010/0188971 | A1* | 7/2010 | Chiang | 370/225 |

OTHER PUBLICATIONS

Batra, Multiband OFDM: Why it wins for UWB.*
Xue, Enhanced IEEE 802.15.3.*
Batra et al, "Multiband OFDM: Why it wins for UWB", Jun. 2003, IEEE Communications DesignLine, all pages.*
Xue et al, "Enhanced IEEE 802.15.3 MAC Protocol for Efficient Support of Multiple Simultaneously Operating Piconets", Jul. 2008, IEEE Transactions on Vehicular Technology, vol. 57, No. 4, pp. 2548-2559.*
Jolly, G. and Younis, M.; "An Energy-Efficient, Scalable and Collision-Free MAC Layer Protocol for Wireless Sensor Networks"; Wireless Communications and Mobile Computing; Aug. 23, 2004; XP0026073302, DOI: http://onlinelibrary.wiley.com/doi/10.1002/scm.222/pdf; retrieved from the Internet on Oct. 28, 2010; (20 pages). Sections 1, 1.1, 3 and 3.3, Figure 1.

(Continued)

*Primary Examiner* — Thai Nguyen
(74) *Attorney, Agent, or Firm* — Maginot, Moore & Beck

(57) ABSTRACT

A wireless transmission method includes providing a commanding node and a plurality of sub-networks. Each of the sub-networks includes at least one responding node. Corresponding ones of a plurality of time slots are assigned to individual ones of the sub-networks based on at least one operational characteristic of the sub-networks. The time slots are disposed within a plurality of frequency channels. Communication is conducted between the commanding node and the sub-networks within the assigned time slots of the sub-networks.

14 Claims, 14 Drawing Sheets

(56) References Cited

OTHER PUBLICATIONS

Dat Tien Nguyen et al.; "A Hybrid TDMA Protocol Based Ultra-Wide Band for In-Car Wireless Communication"; TENCO 2009—2009 IEEE Region 10 Conference, IEEE Piscataway, NJ, USA, Jan. 23, 2009; pp. 1-7; XP031617354; ISBN: 978-1-4244-4546-2; (7 pages). The whole document.

Tamer Elbatt, et al.; "Potential for Intra-Vehicle Wireless Automotive Sensor Networks"; Sarnoff Symposium, 2006 IEEE; IEEE Piscataway, NJ, USA, Mar. 27, 2006; pp. 1-4; XP031266807; ISBN: 978-1-4244-0002-7; (4 pages). The whole document.

\* cited by examiner

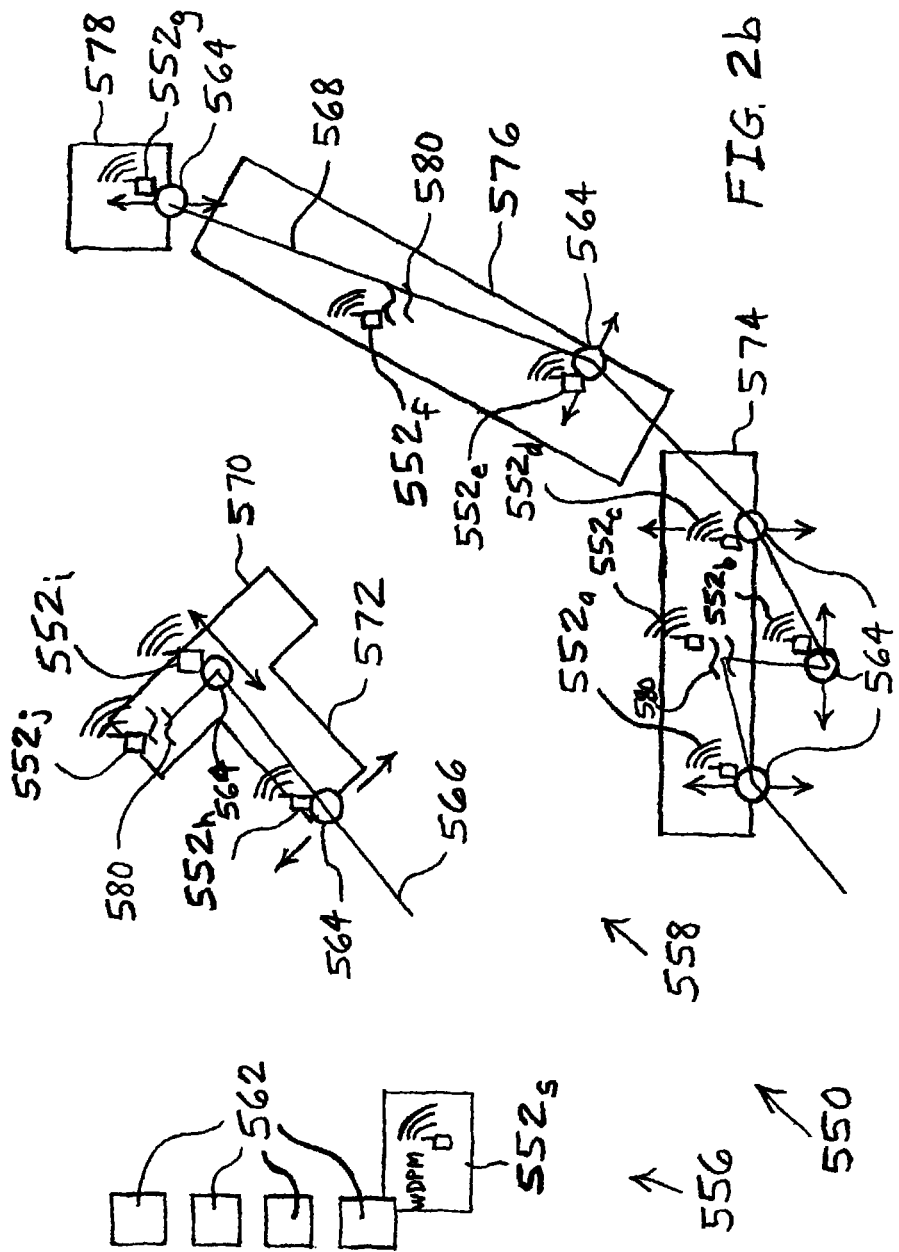

DYNAMIC FUNCTION SLOT ASSIGNMENT IN INTRA-VEHICULAR WIRELESS NETWORKS

BACKGROUND

1. Field of the Invention

The present invention relates to wireless networks, and, more particularly, to assigning time slots within wireless networks.

2. Description of the Related Art

Typically, automotive body domain applications such as seat control, window lift, mirror adjustment, and light control are distributed over the entire car and are interconnected via field bus communication systems. Current architectures have grown fast over the last decades as more and more convenience functions are introduced to the automotive industry.

The current architectures are hierarchical architectures in which several electronic control units (ECUs) are located near the body domain applications such as the seat ECU under the seat, the door ECU within the door, the ECU for rear light control in the trunk of the car, etc. All these ECUs are interconnected over field bus systems such as the "controller area network" (CAN) field bus, and these ECUs form the first hierarchy of the system. This field bus of the first hierarchy can also be regarded as the backbone network of the body domain.

The ECUs usually consist of a microcontroller and socalled peripheral drivers such as semiconductor switches, relays, signal amplifiers, etc. From the ECUs, several pointto-point wires connect to the peripherals of the applications like the motors (window, lift, seat adjustment), pushbutton panels, heating elements, sensors, etc. The number of these peripherals is constantly increasing for each application. For example, fifteen years ago a comfort seat had only three motors to move the seat forward and backward, to adjust the backrest, and to adjust the height. However, current seats may have about fifteen motors for additional functions such as air ventilation, massage functions, etc.

In order to connect the peripherals, a large number of cables may be necessary, which increases the complexity of the cable harness, increases the weight of the car, and increases the costs of the car. The increase in the number of cables may also lead to reliability problems in areas where the cable harness is mounted on moveable parts such as the side mirror, doors, seat, etc. Hence, in known architectures a second hierarchy order in the form of a so-called "subsystem" may be provided. Subsystems may have their own wired communication network which is usually a low cost communication system such as a local interconnect network (LIN). In contrast to the backbone, these networks are usually master-slave systems and not multimaster systems. The ECU that has access to the backbone is usually the master and the peripherals are the slaves. The ECU is also the gateway between the backbone and the subsystem.

The state-of-the-art of automotive electronics is progressing rapidly and it is projected that electronics alone will make up forty percent of the total cost of future cars. All these electronic units in the vehicle are connected through different bus systems depending on the application requirements. Typically, a hierarchical body domain automotive network 100 (FIG. 1) consists of several sub-networks, such as subnetworks 112, 114, connected together to form a larger network. The sub-networks technology being used is, for instance, a Local Interconnect Network (LIN). Each subnetwork consists of a gateway node or ECU 116 and some sensor/actuator nodes 118. Network 100 may include a wired backbone 120 compatible with a Controller Area Network (CAN), FlexRay, Ethernet, etc. Network 100 may also include a body computer 124 and wired communication links 122 compatible with a CAN, Local Interconnect Network (LIN), FlexRay, Ethernet, etc.

ECUs 116 may be interconnected with each other over wired backbone field bus systems 120. Peripherals 118 may be directly connected to ECUs 116. Peripherals 118 may include tiny electronics and may communicate over another field bus with the main ECU. Thus, ECUs 116 may function in such architecture as gateways which communicate on one end with network backbone 120 and on the other end with the local sub-networks. The sub-networks may be organized in master-slave relationships in which the ECU is the master for the distributed tiny electronics in peripherals 118.

A problem associated with the architecture of FIG. 1 is that is that it has poor reliability. For example, if one of the ECUs fails, then the entire associated subsystem is no longer able to operate. Another problem is that there may be long time delays for end-to-end communication as gateways become bottlenecks. Yet another problem is that modularity and scalability are limited by the underlying sub-network systems.

Although implementing at least some of the architecture of FIG. 1 wirelessly has been considered, wireless communication is unpredictable and hence raises questions about the responsiveness of such a system as compared to wired networks. Another challenge is in avoiding interference between the wireless signals of adjacent systems, such as in adjacent automobiles. Yet another challenge is in taking advantage of the flexibility in communication methods that is afforded by wireless systems.

What is neither disclosed nor suggested in the art are methods of wireless communication that may avoid the abovementioned problems, that more fully take advantage of the flexibility of wireless communication, and that provide more robust network performance.

SUMMARY OF THE INVENTION

The present invention provides novel techniques that can be employed for dynamically assigning time slots to sets of nodes for communication in wireless intra-vehicular networks. The novel schemes of the invention may provide time slot assignments according to a function, application or other characteristic of a sub-network that is engaged in communication during the time slot, or of the message that is transmitted during the time slot. The present invention may be applicable for automotive networks, such as body domain and powertrain applications, as well as for other, non-automotive applications. For example, the principles of the present invention may be applied to industrial networks, cargo, airplanes, ships, etc.

The invention comprises, in one form thereof, a wireless transmission method including providing a commanding node and a plurality of sub-networks. Each of the sub-networks includes at least one responding node. Corresponding ones of a plurality of time slots are assigned to individual ones of the sub-networks based on at least one operational characteristic of the sub-networks. The time slots are disposed within a plurality of frequency channels. Communication is conducted between the commanding node and the sub-networks within the assigned time slots of the sub-networks.

The invention comprises, in another form thereof, a wireless transmission method including providing a commanding node and a plurality of sub-networks. Each of the sub-networks includes at least one responding node. An operation mode is selected in which the commanding node and the sub-networks operate. Corresponding ones of a plurality of time slots are assigned to individual ones of the sub-networks based on the selected operation mode. The time slots are disposed within a plurality of frequency channels. Communication is conducted between the commanding node and the sub-networks within the assigned time slots.

The invention comprises, in yet another form thereof, a wireless transmission method including providing a commanding node and a plurality of sub-networks. Each of the sub-networks including at least one responding node. Corresponding ones of a plurality of first time slots are assigned to individual ones of the sub-networks. The first time slots are disposed within a plurality of frequency channels. Communication is conducted between the commanding node and the sub-networks within the assigned first time slots. A signal quality compromise associated with one of the frequency channels is sensed. In response to the sensing of the signal quality compromise, corresponding ones of a plurality of second time slots are assigned to the individual ones of the sub-networks. The second time slots are disposed within the frequency channels other than the one frequency channel associated with the signal quality compromise. Communication is conducted between the commanding node and the sub-networks within the assigned second time slots.

An advantage of the present invention is that it more fully optimizes the features of wireless communication.

Other advantages of the present invention include simpler network/application design; flexible, modular and composable protocol design; application-specific diagnosis; accommodation of future add-ons; the ability to shut-off all the sub-networks on one channel in the event that battery power is below a threshold level; and the ability to move communications from a first channel to a second channel in the event that the first channel becomes temporarily unavailable.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 2b is a schematic diagram of one embodiment of an automotive body domain architecture that may be used in conjunction with at least one embodiment of the present invention.

Figure 1:
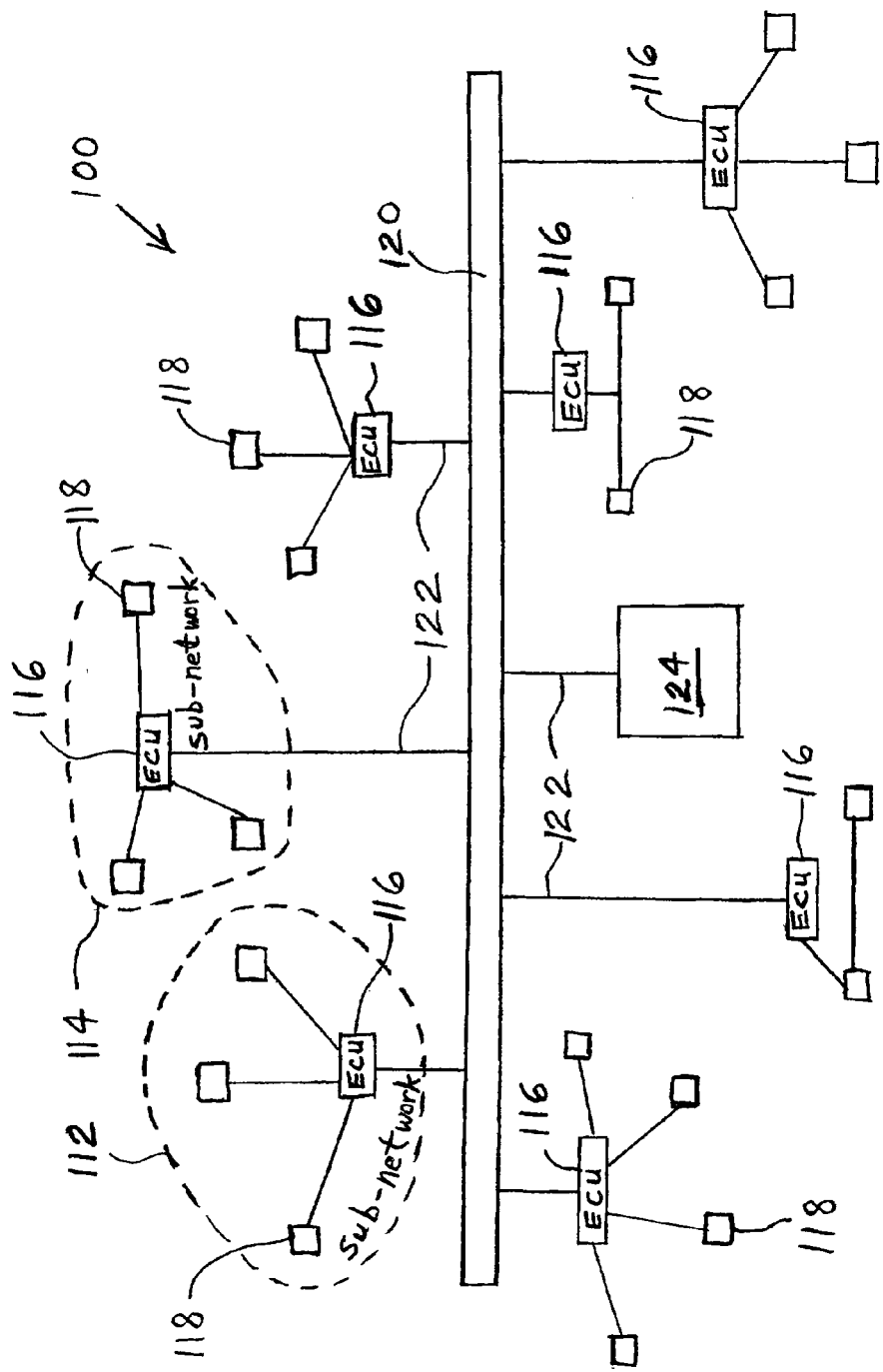
FIG. 1 is a block diagram of a wired hierarchical body domain automotive network architecture of the prior art.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 2A:
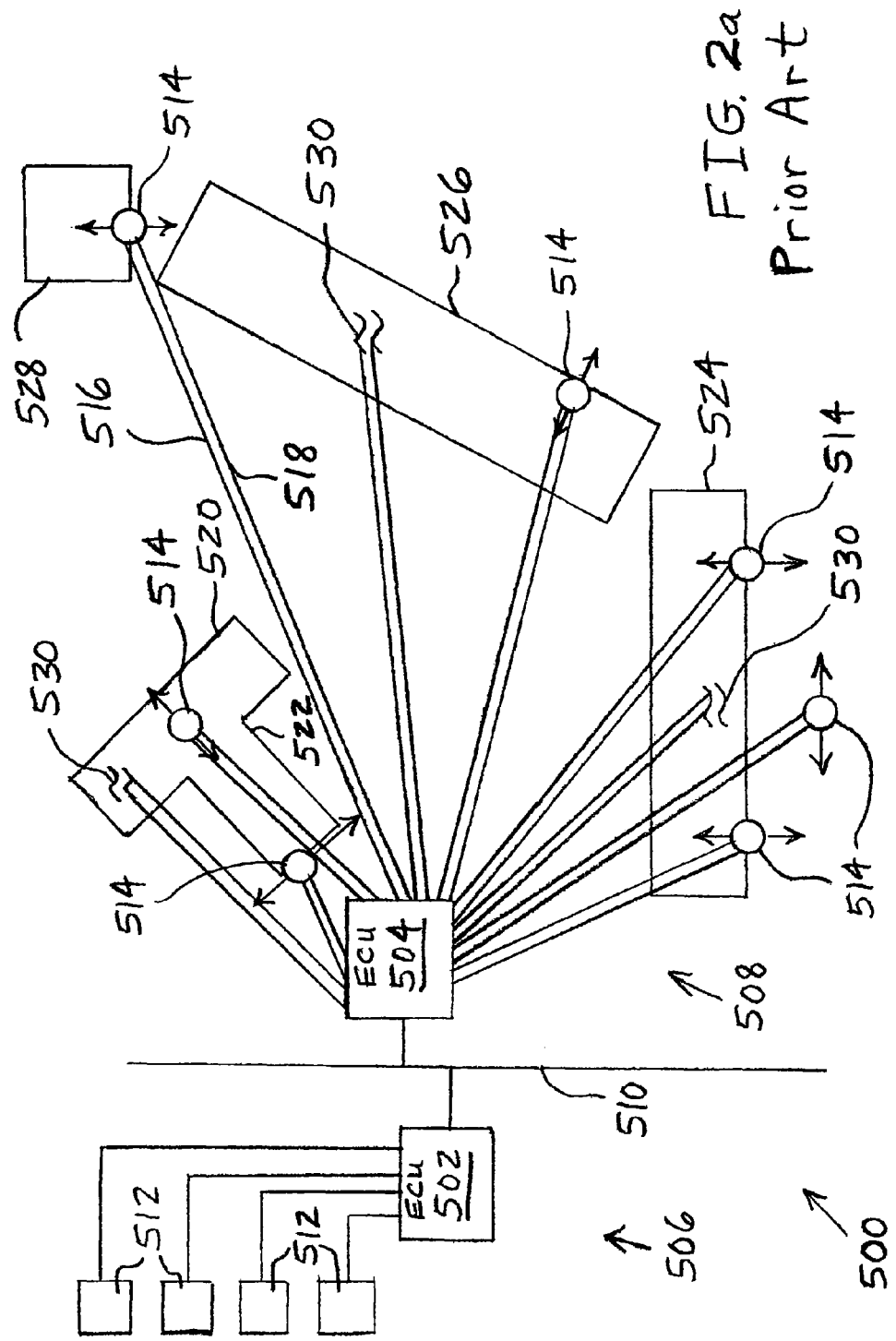
FIG. 2a is a schematic diagram of a prior art automotive body domain architecture.

As described above with reference to FIG. 1, a wired automotive network may include several sub-networks connected together using a backbone network of ECUs and gateways. As shown in FIG. 2a, often several actuators are part of one sub-network and are controlled by a single ECU. The ECU may perform the command translation and send the appropriate signals to the desired actuators in a pre-defined order. The order may be decided according to the functional requirements. Due to practical limitations such as power control, only a set of actuators may be able to function at the same time.

FIG. 2a illustrates a known automotive body domain architecture 500 including central ECUs 502, 504 of a door module 506 and a seat module 508, respectively. ECUs 502, 504 are interconnected by a body CAN 510. Dedicated wires run to the various actuators, such as pushbuttons 512 and DC engines (i.e., motors) 514 with Hall sensors. There are four wires connected to each motor 514. Specifically, two wires are provided in a power cable 516 for powering the motor, and two wires are provided in a communication cable 518 for connection to the Hall sensor to measure the revolution of motor 514. Motors 514 are provided in both steering elements 520, 522 and in seat elements 524, 526, 528. Heaters 530 are provided in steering element 520 and in seat elements 524, 526. For each of cables 516, 518 there are at least two connectors, i.e., one connector for connection to the ECU and another connector for connection to the motor/heater.

An alternative wireless architecture and seat sub-network of lower cost and complexity is described in a U.S. patent application filed even date herewith, entitled "Architecture for Automotive Electrical Body Systems", having inventors Thomas Hogenmueller and Vivek Jain, which is hereby incorporated by reference herein in its entirety.

FIG. 2b illustrates a wDPM-based automotive body domain architecture 550 that may be used in conjunction with the present invention including decentralized wDPMs $552_{a-j}$ instead of intermediary centralized ECUs in a door module 556 and a seat module 558. The only wiring needed is two power cables 566, 568. Each wDPM 552 is associated with the pushbuttons 562, a motor 564 or a heater 580. Each motor 564 may have a Hall sensor to measure the revolution of motor 564 and to communicate the motor position to the associated wDPM $552_{a-j}$. Motors 564 are provided in both steering elements 570, 572 and in seat elements 574, 576, 578. Heaters 580 are provided in steering element 570 and in seat elements 574, 576.

The commanding or supervising node wDPM $552_s$ associated with pushbuttons 562 may communicate with the responding nodes wDPMs $552_{a-j}$ associated with seat module 558. In response to inputs from a user interface, such as a user manually pressing at least one of pushbuttons 562, the wDPM $552_s$ associated with pushbuttons 562 may wirelessly transmit a command signal to at least one of the wDPMs $552_{a-j}$ associated with seat module 558. The command signal may instruct the receiving wDPM $552_{a-j}$ to actuate its associated motor 564 or apply power to, or take power from, its associated heater 580.

Each of wDPMs $552_{a-j}$ associated with seat module 558 may be controlled by commanding node wDPM $552_s$ associated with pushbuttons 562. Within such a scheme, the methods of the present invention may improve the responsiveness of the actuator such that the command executes or starts executing within the given delay. Issues similar to those described above may also arise in connection with industrial networks.

Figure 3:
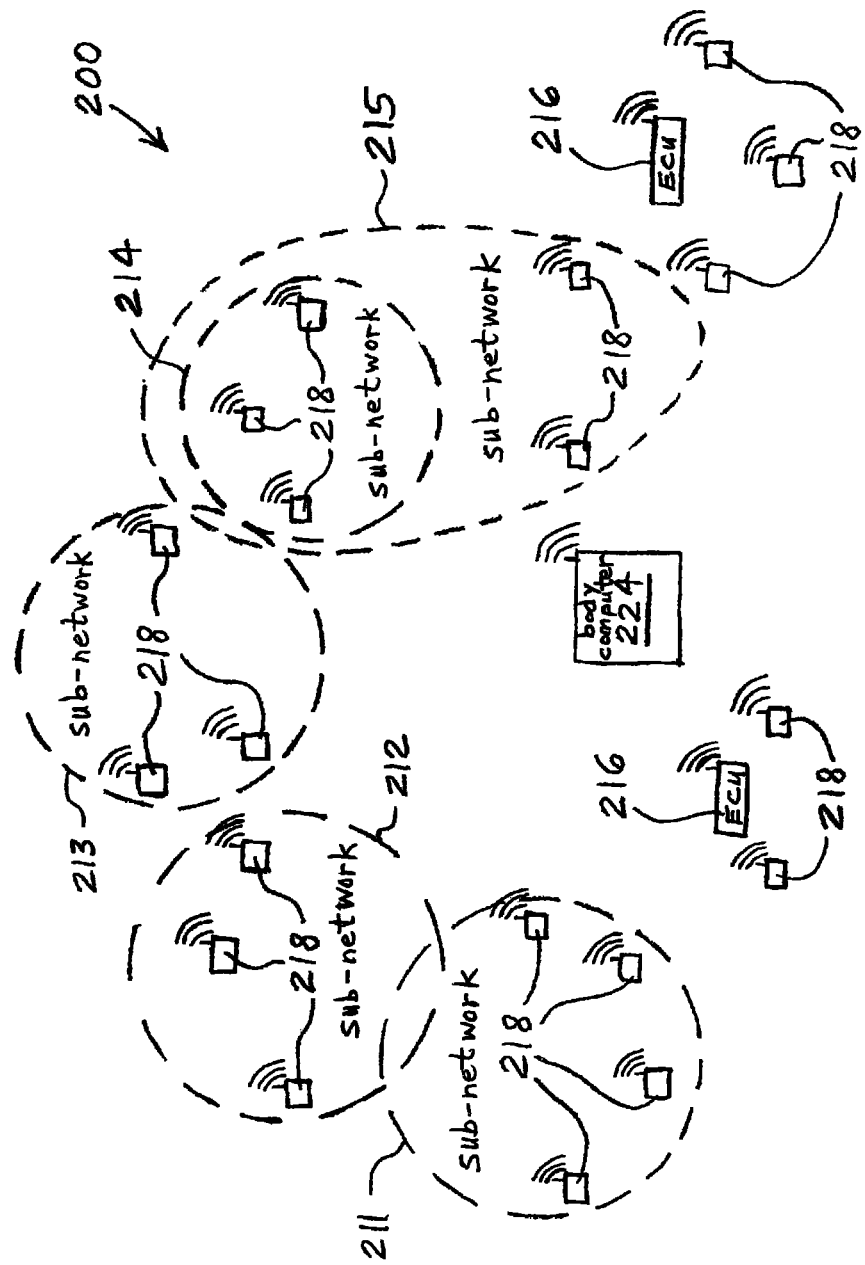
FIG. 3 is a block diagram of one embodiment of a network architecture including a wireless communication system that may be used in conjunction with at least one embodiment of the present invention.

Referring now to FIG. 3, there is shown an automotive network 200 of the present invention which may circumvent the problems of the prior art by using wireless communication, and which may be used in conjunction with at least one embodiment of the present invention. Network 200 includes sub-networks 211-215 which may each represent a different class of peripherals 218. For example, sub-networks 211-215 may be clusters of pushbutton panels, lights, sensors, small electric motors, and actuator components, respectively. There may be some overlap between sub-networks. For example, the small electric motor sub-network 214 may be a subset of the larger actuator component sub-network 215, as shown in FIG. 3. However, as described in more detail below, the wireless nodes of network 200 may be grouped in sub-networks in different ways to accommodate the various time slot assignment schemes of the present invention.

Wireless gateway ECUs 216 may communicate wirelessly, such as via radio frequency communication, with wireless sensor/actuator nodes 218 within the sub-network of each gateway ECU 216. A body computer 224 may be in direct wireless communication with peripherals 218 in sub-networks 211-215, and may communicate via the ECUs 216 with peripherals 218 that have the ECU 216 in their sub-network.

In at least one embodiment of the invention, only one wireless communication system may be used for the entire body domain. As is evident from FIG. 3, ECUs 216 may be largely eliminated. In other embodiments, ECUs may be completely eliminated. In the absence of ECUs, the actuator, sensors, and pushbutton panels may have very small electronics with a wireless communication interface (e.g., a wireless distributed peripheral module (wDPM)). In at least one embodiment of the invention, only a single communication interface is used for the body domain, replacing centrally-organized ECUs with non-centralized wDPMs, and use of the new communication pattern in which peripherals may communicate directly instead of using an ECU as an intermediary.

According to at least some embodiments of the invention, nodes 218 with related functions or the same application are grouped together as sub-networks. For the network to operate in a more effective manner, a medium access mechanism may be developed. There are at least two possible mechanisms: contention-based (event-driven) mechanisms and collision-free (time slotted) mechanisms. Time slotting protocols are often used for static wireless networks, providing improved performance as packet losses may be primarily due to channel noise rather than to collisions. However, a possible downside is decreased responsiveness, especially if the time slots are not assigned properly. The present invention may provide several time-slot assignment and management strategies with specific properties. Depending on the situation, one of these techniques may be selected and easily applied.

Slot Assignment Schemes

Figure 4:
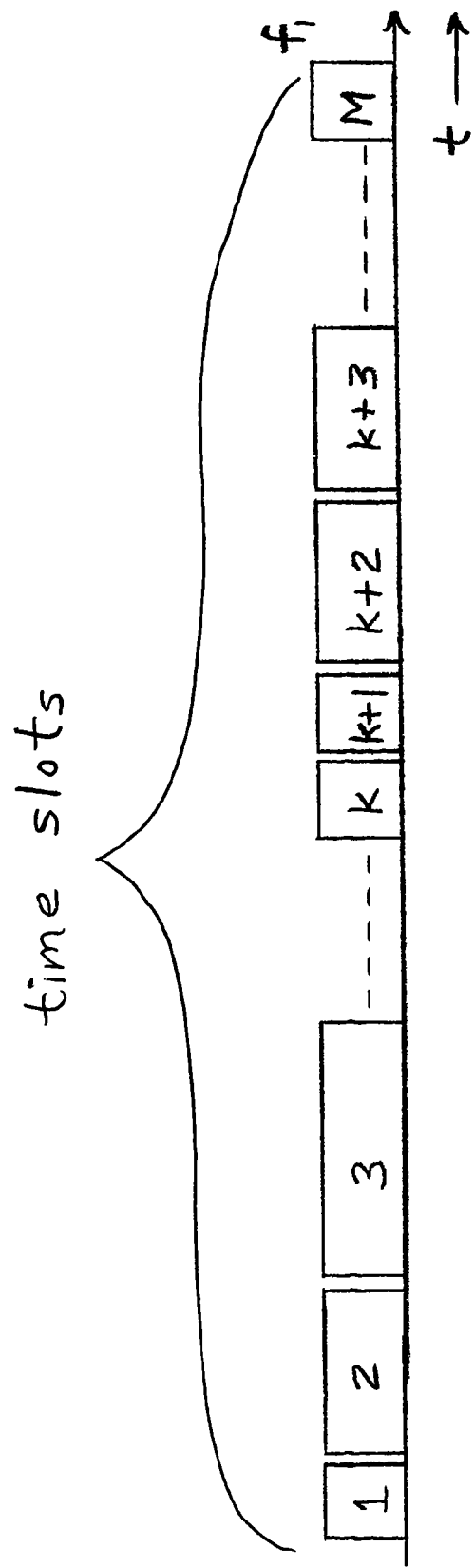
FIG. 4 is a diagram of a reference time-slot assignment scheme accommodating M number of sub-networks.

FIG. 4 illustrates a reference time slot assignment scheme accommodating M number of sub-networks. Time slots are generally assigned to the sub-networks, and the manner in which the time slots are used may be at the discretion of the ECUs or master node(s) in that sub-network.

Considering that there may be a maximum allowed response time for each of the sub-networks, and that wireless communication is inherently less reliable than wired communication (which may increase the time requirements to accommodate retransmissions of message, etc.), it may not be desirable to have all of the sub-networks on one frequency channel. Hence, multiple channels may be employed. However, the number of non-overlapping frequency channels that are available may be limited, and adjacent neighboring cars may be using the same form of wireless communication. Thus, it may be desirable for the overall schedule to use a minimal number of frequency channels. To this end, a dynamic time slot assignment scheme may also be desirable. Several other benefits may also be derived from a dynamic time slot assignment scheme, as described further hereinbelow.

Function-Dependent Sub-Network Assignment

As opposed to location-based sub-network assignment as implemented in wired networks, one embodiment of the present invention provides function-dependent sub-network assignment of nodes in wireless networks. Possible examples of such a scheme designate the seat, door, mirror, etc. as independent sub-networks. In known sub-networks, geographically co-located nodes are controlled by the same ECU or master nodes. With function-dependent sub-network assignment, however, nodes may be grouped into sub-networks by the function of the node, e.g., seat, door, mirror, etc. Advantages/features of this scheme may include: simpler network/application design; better application performance with fewer messages; a given node can be part of several sub-networks depending on the function/application; dynamic (i.e., changeable) grouping of nodes into sub-networks is possible; enhanced expandability with future add-ons is possible; and application-specific problem diagnosis is possible.

Function-Dependent Time Slot Assignment

Figure 5:
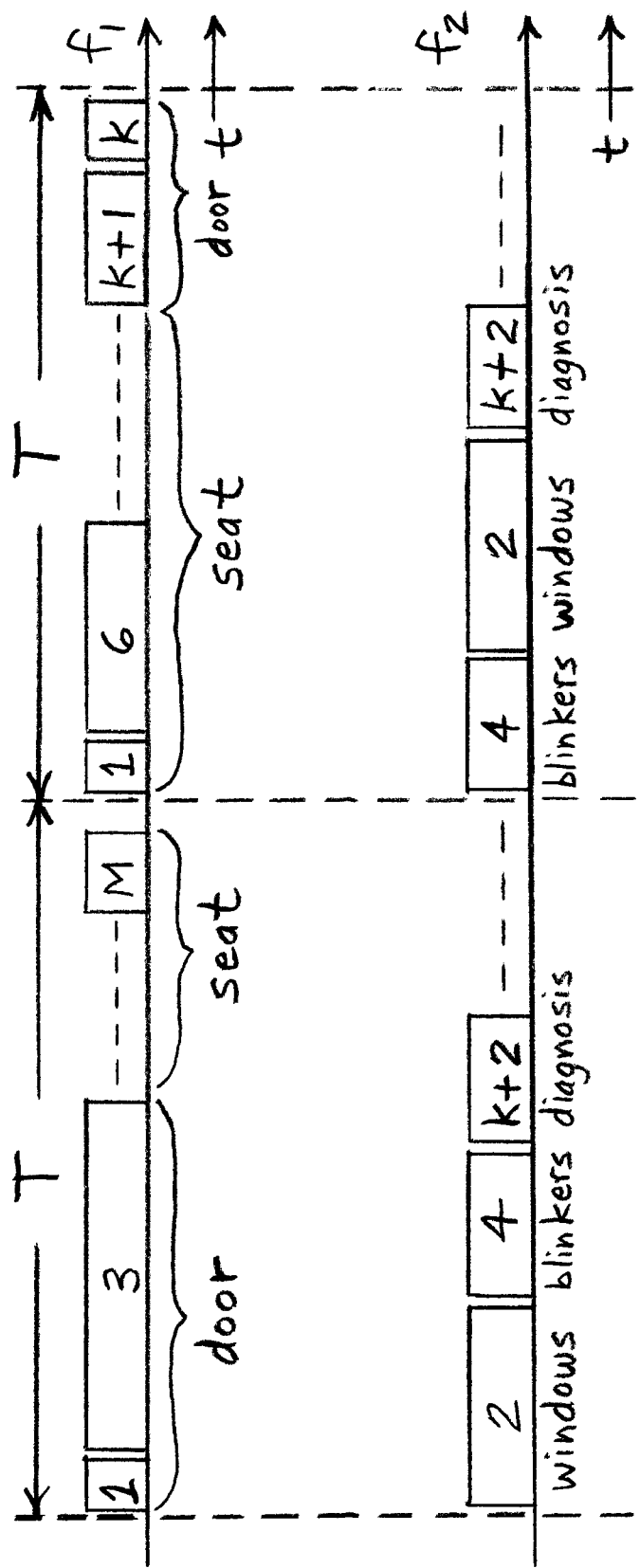
FIG. 5 is a diagram of one embodiment of function-dependent slot assignments of the present invention.

In one embodiment of a function-dependent time slot assignment scheme of the invention, slots are assigned to sub-networks according to the functions of, or performed by, the sub-networks. In the example illustrated in FIG. 5, all door and seat sub-network slots are provided on one channel, while windows, blinkers, and diagnosis sub-network slots are provided on another channel, and so on. For instance, a sub-network performing door-related functions, such as locking/unlocking doors, may use the slots designated "door" in FIG. 5; and a sub-network performing window-related functions, such as raising/lowering windows, may use the slots designated "windows" in FIG. 5, etc. Advantages/features of this function-dependent time slot assignment scheme may include: being able to simultaneously address on different channels sub-networks having mutually exclusive functions; a flexible, modular and composable protocol design; application-specific diagnosis is possible; and better application control and performance.

Frequency Hopping Time Slot Assignments for Periodic Functions

Figure 6:
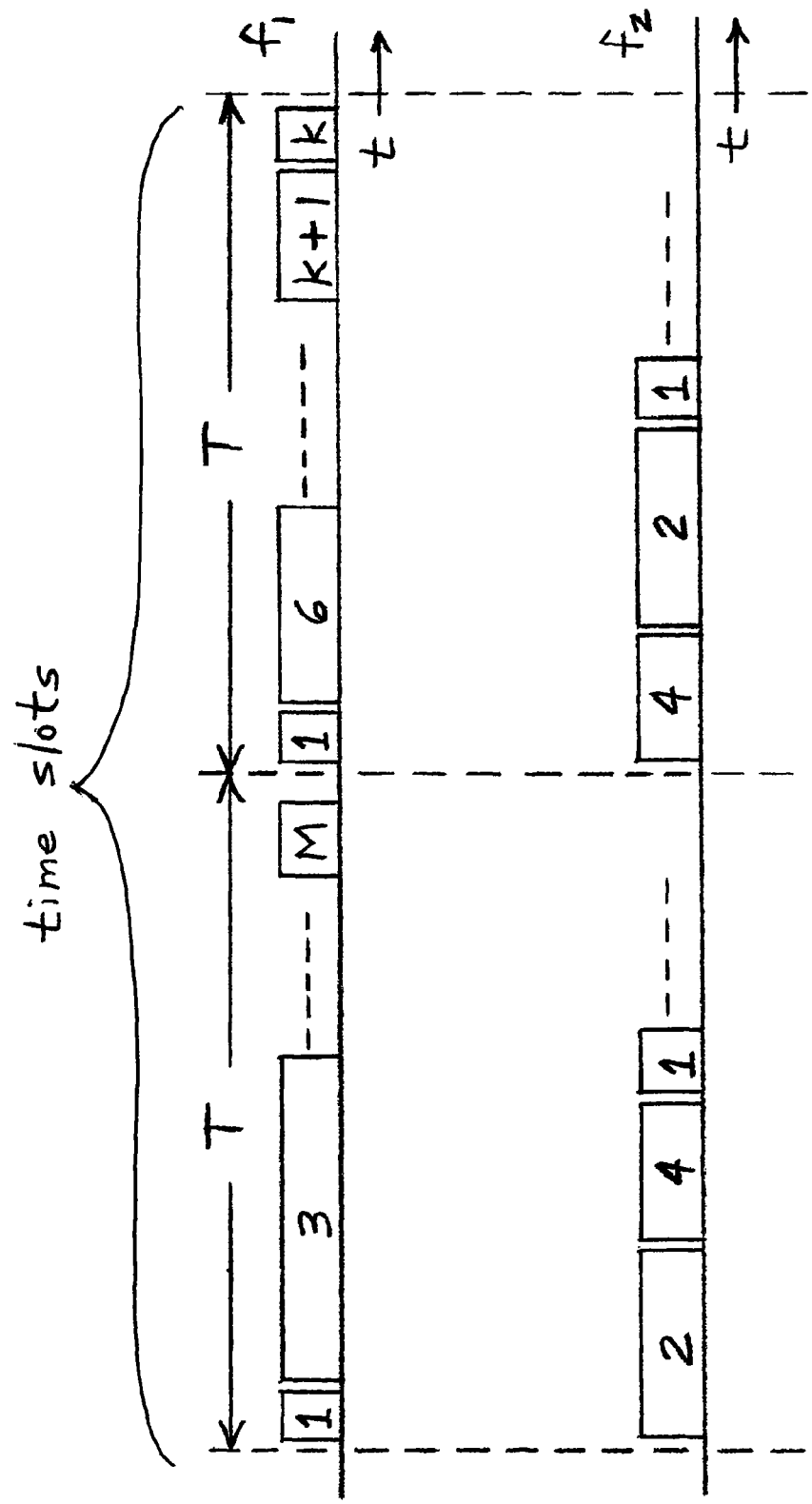
FIG. 6 is a diagram of one embodiment of frequency hopping slot assignments for periodic functions according to one embodiment of the present invention.

Many applications may call for periodic data, such as an occupancy sensor. In the event that the function periodicity is difficult to address or accommodate on one channel, then slots on another channel may be used as well, as provided by a frequency hopping time slot assignment method of the invention for periodic functions. For example, as shown in FIG. 6, the periodic communication needs of sub-network or node "1" may be accommodated by using both frequency channels $f_1$ and $f_2$. Moreover, the time slots assigned to sub-network or node "1" may alternate in time between the two frequency channels. Advantages/features of this periodic function hopping assignment scheme may include: less stress than on a single channel that supports a periodic function by itself; redundancy, i.e., if one channel is bad, then the message may be received on the other channel; and the ease of implementation and schedule formation.

Security Protection-Dependent Slot Assignments

Figure 7:
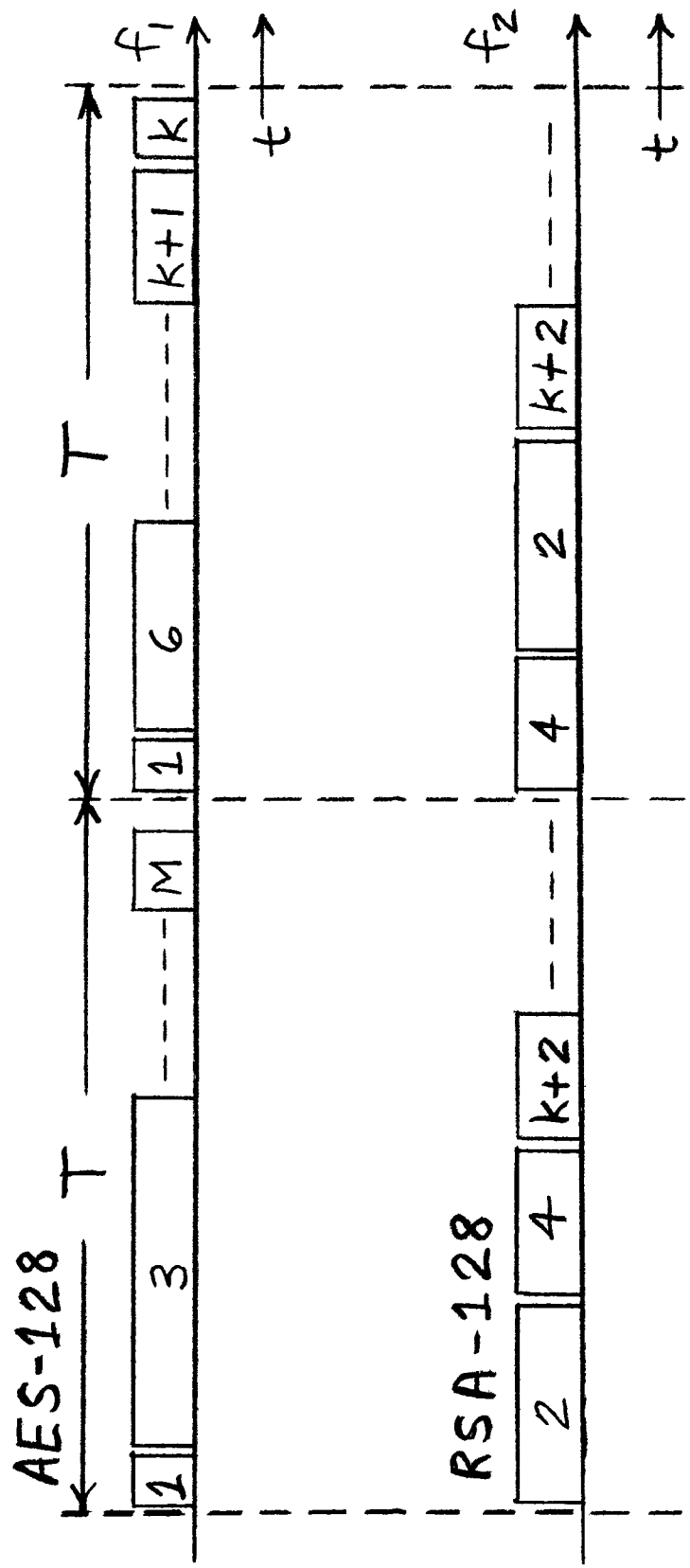
FIG. 7 is a diagram of one embodiment of protection-dependent slot assignments of the present invention.

In this security protection-dependent scheme of assigning time slots, functions or sub-networks are assigned to frequency channels, and to time slots within frequency channels, depending upon the security requirements of the function or sub-network. Each frequency channel may carry functions or sub-networks having a same security level or a same type of security protection. For example, in the embodiment illustrated in FIG. 7, channel $f_1$ carries functions or sub-networks protected with Advanced Encryption Standard block cipher AES-128, and channel $f_2$ carries functions or sub-networks protected with RSA 128-bit encryption. Advantages/features of this security protection-dependent slot assignment scheme may include: a reduction in overhead in deploying security mechanisms as a result of grouping functions based on their security classes; all functions on one security channel can use the same security keys, thereby making implementation easier and reducing message overheads for exchanging security information within each function slot; and better responsiveness for messages that are not security-critical.

Figure 8:
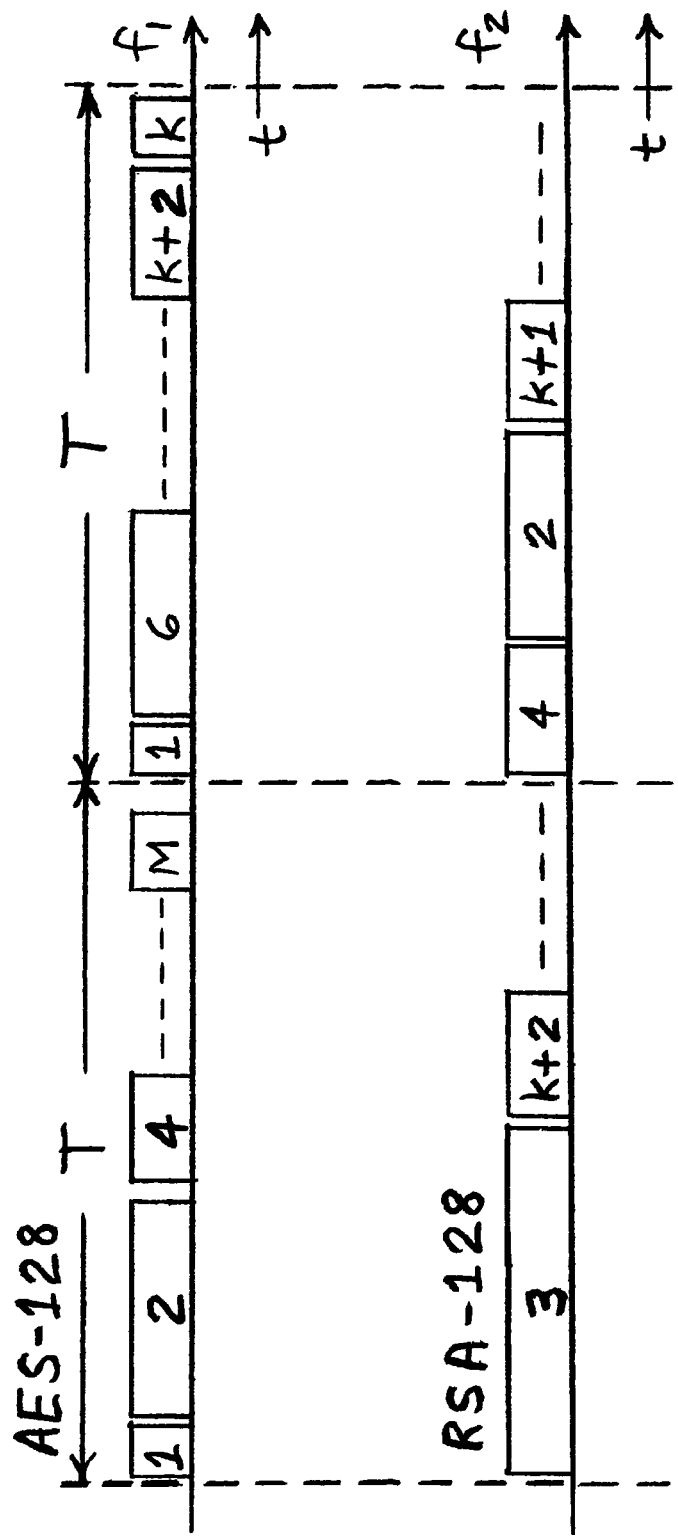
FIG. 8 is a diagram of one embodiment of protection-dependent slot assignments with sub-network channel hopping according to the present invention.

Security Protection-Dependent Slot Assignments With Sub-Network Channel Hopping A possible extension of the above-described security protection-dependent scheme involves the sub-networks hopping between slots on different frequency channels which employ different security schemes. For example, in the embodiment illustrated in FIG. 8, sub-networks "2" and "4" hop from channel $f_1$ in the first time period to channel $f_2$ in the second time period. Similarly sub-network "k+2" hops from channel $f_2$ in the first time period to channel $f_1$ in the second time period. As in the embodiment of FIG. 7, channel $f_1$ carries functions or sub-networks protected with Advanced Encryption Standard block cipher AES-128, and channel $f_2$ carries functions or sub-networks protected with RSA 128-bit encryption. Additional advantages/features of this security protection-dependent, sub-network channel hopping slot assignment scheme may include: enhanced reliability and security; and improved performance in the event that one of the channels is faulty.

Power Usage-Dependent Slot Assignments

Figure 9:
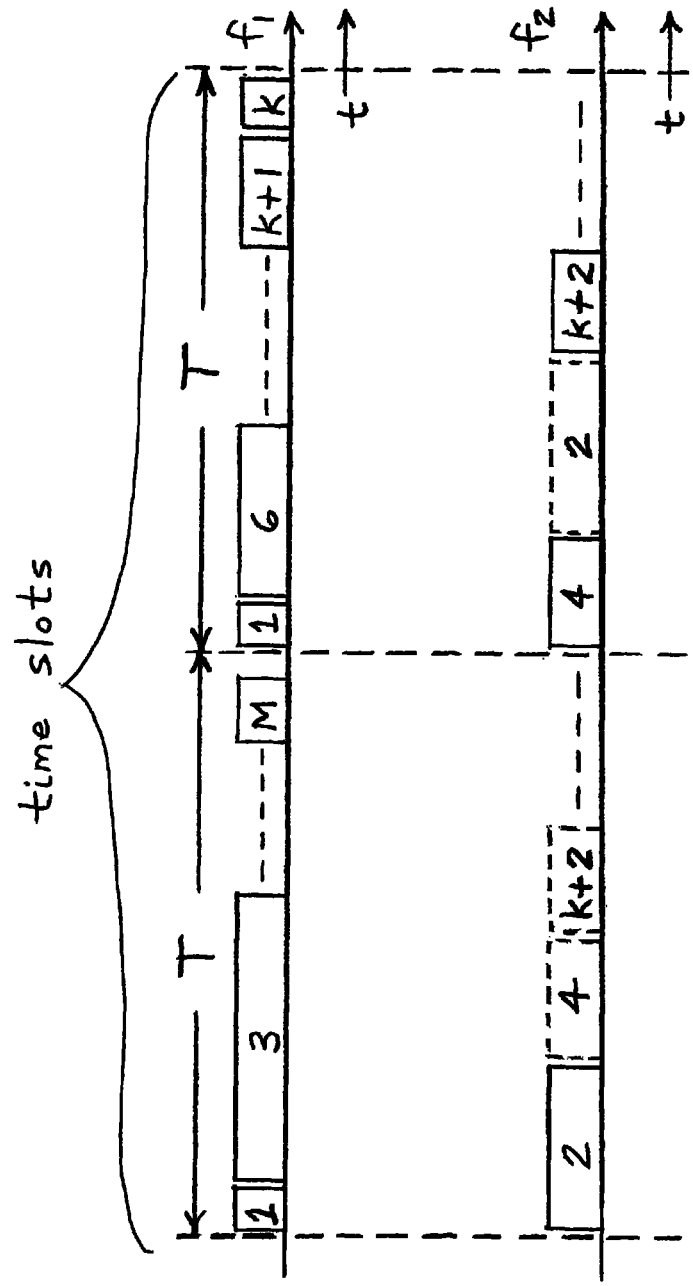
FIG. 9 is a diagram of one embodiment of power usage-dependent slot assignments of the present invention.

In this power usage-dependent scheme of assigning time slots, functions or sub-networks are assigned to frequency channels depending upon the level of power usage of the function or sub-network. Each frequency channel may carry functions or sub-networks having a same level of power usage. For example, sub-networks using wake-up schemes and thus using a low level of power may be grouped in one channel, while other sub-networks that are always "ON" and thus using a high level of power may be grouped in the other channel. In the embodiment illustrated in FIG. 9, channel $f_1$ carries high power functions or sub-networks that are always "ON", and channel $f_2$ carries low power functions or sub-networks that use wake-up schemes. In FIG. 9, sub-networks that are not currently awake and thus are drawing a very low level of power are indicated in dashed borders.

Advantages/features of this power usage-dependent slot assignment scheme may include: the ability to shut-off all sub-networks on one channel (such as high power sub-networks) in the event that the level of energy stored in a battery is below a threshold, or in the event that the channel is temporarily unavailable. For instance, if a particular channel is temporarily unusable because of interference, the sub-networks on that channel may be temporarily shut-off until the interference subsides. Another advantage is that sub-networks having different wakeup and sleeping schedules may be segregated into different channels.

MAC-Dependent Slot Assignments

Figure 10:
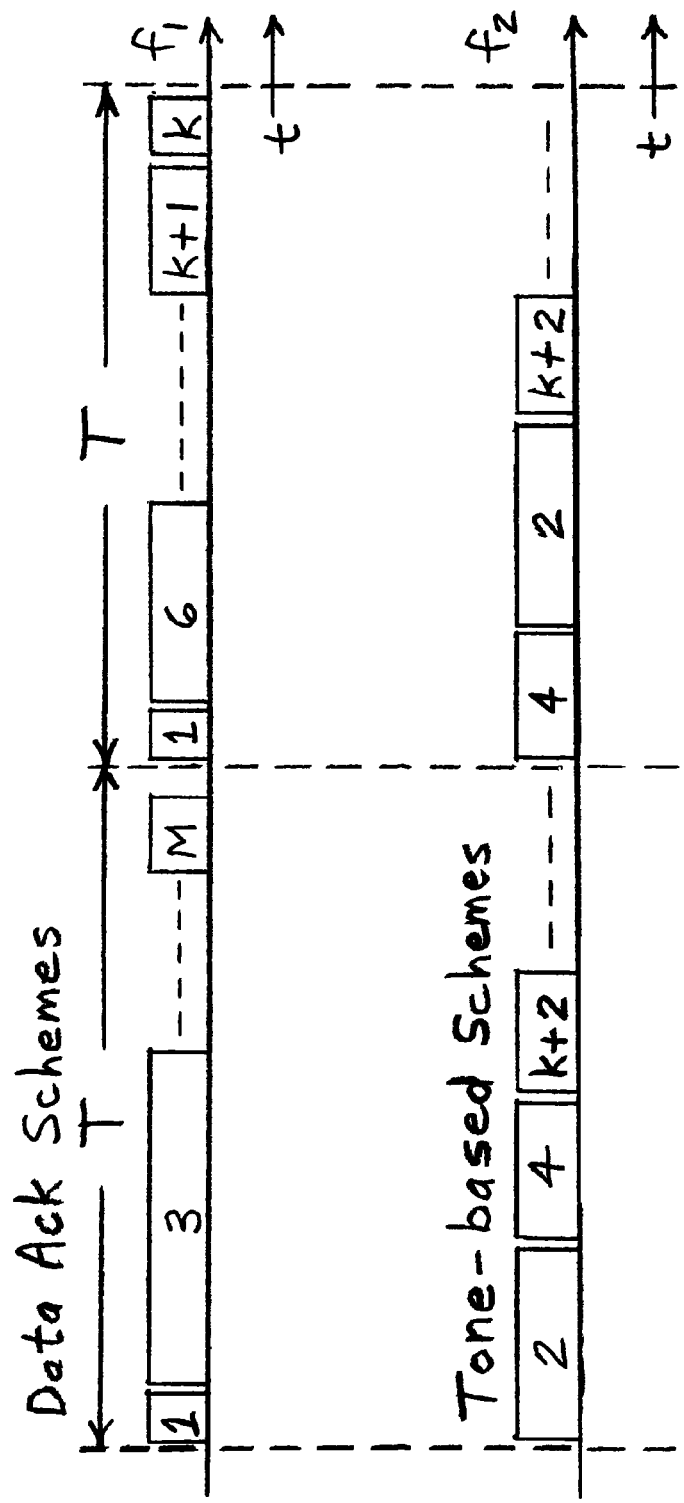
FIG. 10 is a diagram of one embodiment of media access control protocol-dependent slot assignments of the present invention.

In this media access control protocol-dependent scheme of assigning time slots, functions or sub-networks are assigned to frequency channels depending upon the media access control protocol of the function or sub-network. Each frequency channel may carry functions or sub-networks having a same MAC scheme. In the embodiment illustrated in FIG. 10, for example, channel $f_1$ carries communication of functions or sub-networks associated with data-Ack schemes, and channel $f_2$ carries communication of functions or sub-networks associated with tone-based schemes. Examples of such tone-based schemes may be disclosed in U.S. patent application Ser. No. 12/248,311, filed Oct. 9, 2008, and entitled "Method of Using Acknowledgment Tones for Data Consistency in Intra-Vehicular Wireless Networks," which is incorporated herein by reference in its entirety. Advantages/features of this MAC protocol-dependent slot assignment scheme may include: event-triggered and time-triggered functions/sub-networks being on separate channels; and improved application performance.

Priority-Dependent Slot Assignments

Figure 11:
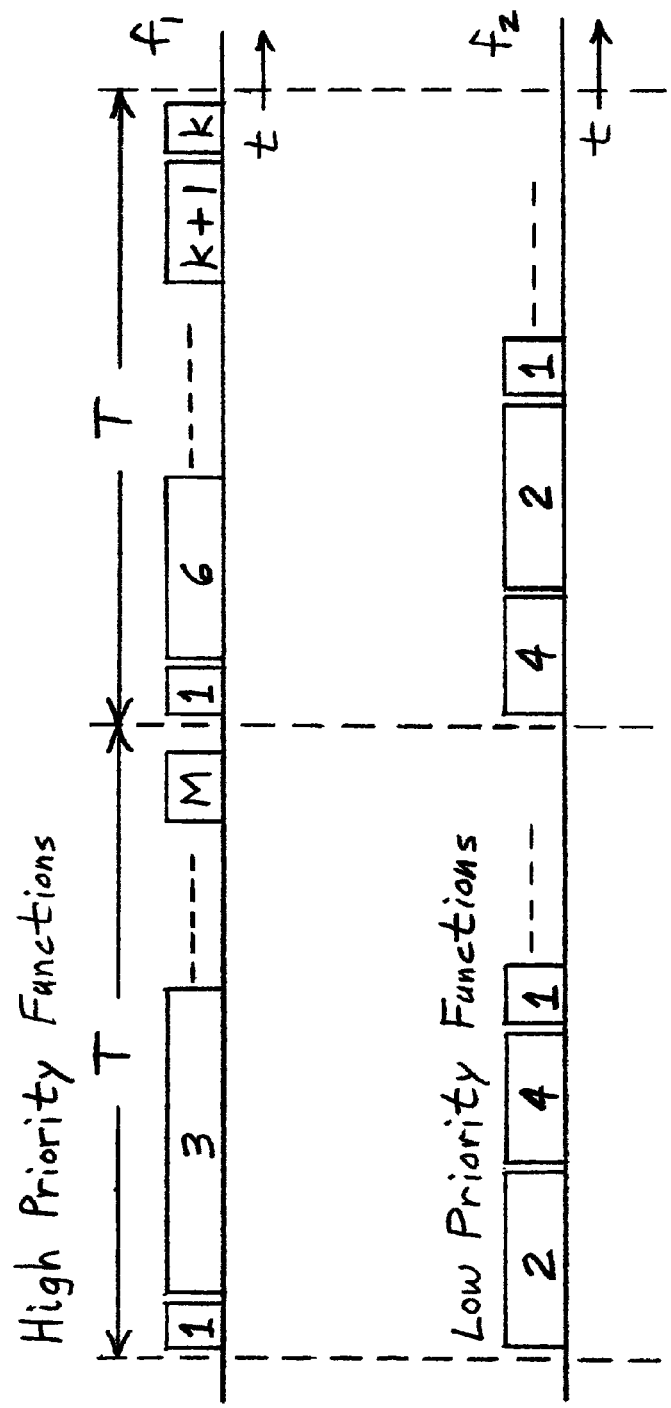
FIG. 11 is a diagram of one embodiment of priority-dependent slot assignments of the present invention.
Figure 12A:
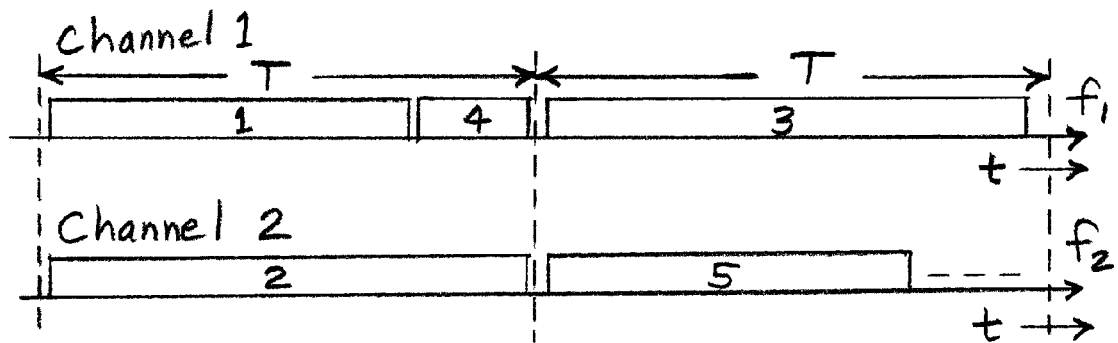
FIG. 12a is a diagram of one embodiment of operation mode-dependent slot assignments of the present invention in an initialization mode.
Figure 12B:
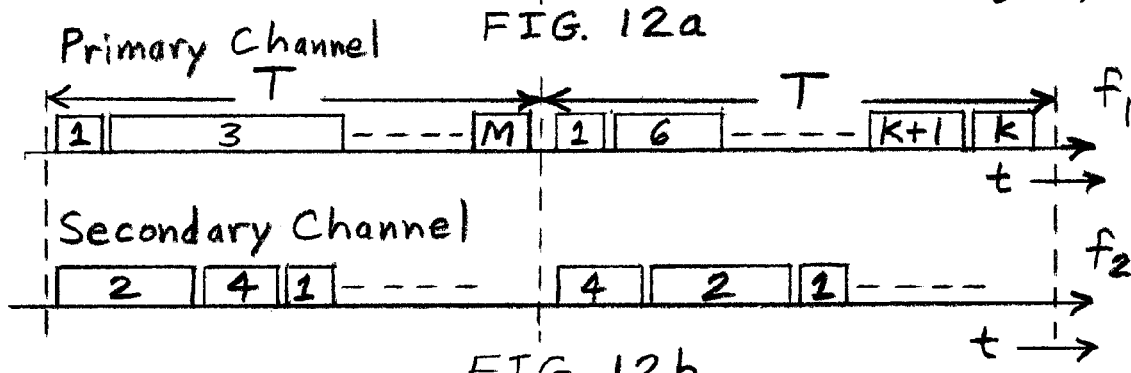
FIG. 12b is a diagram of one embodiment of operation mode-dependent slot assignments of the present invention in a startup/shutdown mode.
Figure 12C:
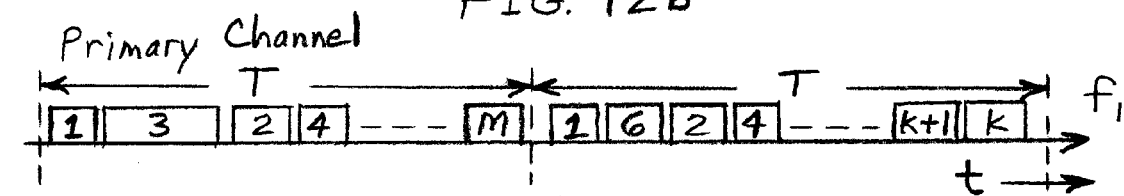
FIG. 12c is a diagram of one embodiment of operation mode-dependent slot assignments of the present invention in a normal mode.
Figure 12D:
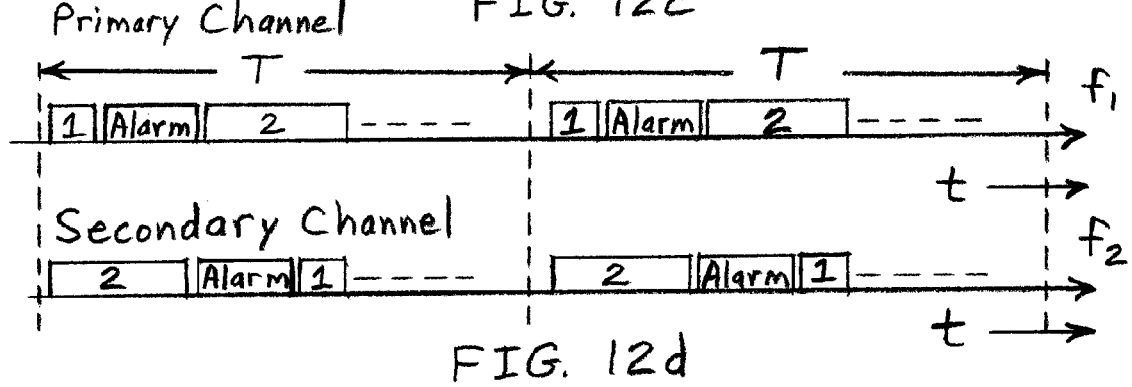
FIG. 12d is a diagram of one embodiment of operation mode-dependent slot assignments of the present invention in an emergency mode.

In this priority-dependent scheme of assigning time slots, functions or sub-networks are assigned to frequency channels depending upon the level of priority of the function or sub-network. Each frequency channel may carry functions or sub-networks having a same level of priority. In the embodiment illustrated in FIG. 11, for example, channel $f_1$ carries communication of functions or sub-networks having a high level of priority, and channel $f_2$ carries communication of functions or sub-networks having a low level of priority. Advantages/features of this priority-dependent slot assignment scheme may include: the ability to shut-off all the sub-networks on low priority channels in the event that the energy stored in the battery is below a threshold level or another channel is temporarily unavailable; and the ability of high priority functions to use unused slots on low priority channels for better response and extra redundancy.

Operation Mode-Dependent Slot Assignments

In this operation mode-dependent scheme of assigning time slots, functions or sub-networks may be assigned to frequency channels, and to time slots within frequency channels, depending upon the current operating mode of the network. In one embodiment, the current operating mode of the network is decided by a commanding node. Operation-based slot assignments may include assigning slots in different ways for initialization, startup/shutdown, normal and emergency modes, as illustrated in FIGS. 12a-d, respectively. The initialization mode of FIG. 12a may be used only during the factory installation and node reprogramming/installation at the garage. During startup/shutdown multiple status/diagnostics commands may need to be transmitted for nearly all systems or sub-networks within a limited time duration. Hence, with each function slot taking extra time for status/diagnostics, it may be desirable to use multiple channels. However, during normal operation, slots of short time duration may be sufficient to exchange status information and issue occasional commands. Operation in an emergency mode, on the other hand, may call for most important functionalities to have slots on multiple channels with some slots for alarm messages as well.

Advantages of the flexibility provided by the operation mode-dependent slot assignment scheme may include function slots being able to satisfy application requirements during multiple modes in an adaptive manner. In contrast, a fixed scheme would lead to either a loss of quality during bursty (congested) times or to a waste of time slots during idle times. Another advantage of the operation mode-dependent slot assignment scheme is that it may result in better energy and message management. Yet another advantage is that, during the startup/shutdown process, the higher priority functions may be assigned slots on the primary channel so that the system still operates at an acceptable level in the event that one or more secondary channels are unavailable.

Dynamic Slot Merging and Splitting

Figure 13:
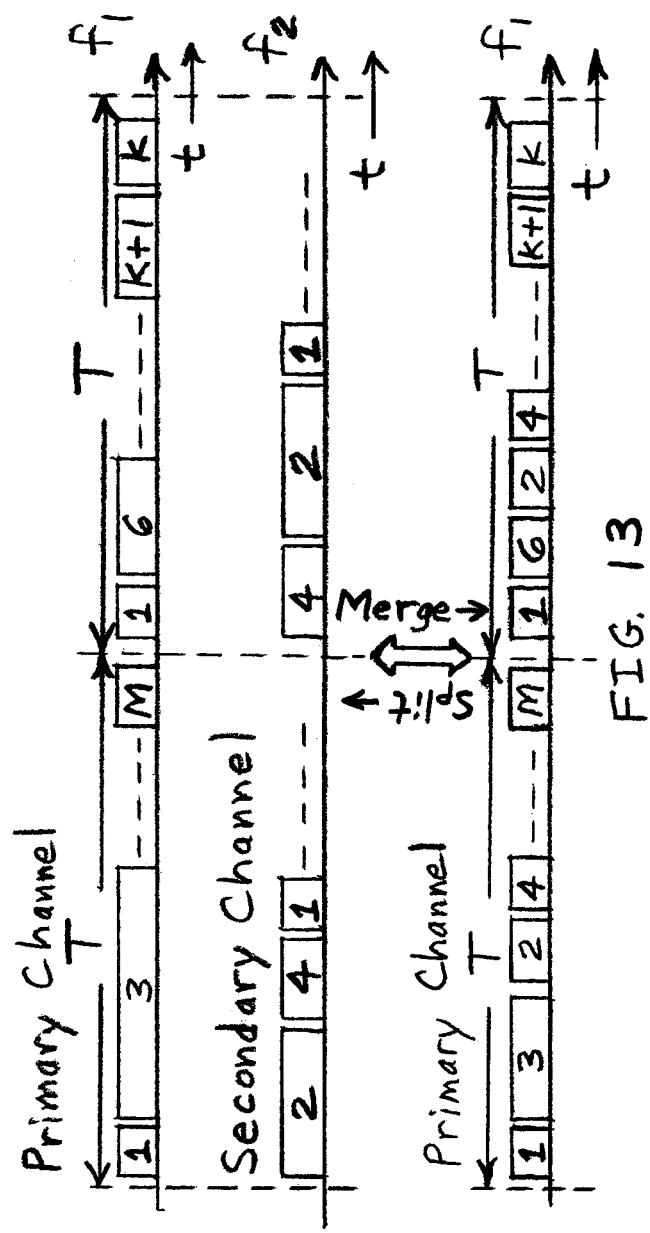
FIG. 13 is a diagram of one embodiment of slot assignments with dynamic slot merging and splitting between the startup/shutdown mode of FIG. 12b and the normal mode of FIG. 12c according to one embodiment of the present invention.

In certain situations, it may be temporarily impractical or impossible to use multiple channels due to jamming or interference problems. In such a case, the system of the invention may be adaptive enough to accommodate all sub-networks and/or all time slots on a single channel. When the problem with the other channel subsides, it may then be possible to switch back to the original configuration wherein all channels are utilized. Thus, the method of the invention may include sensing jamming or interference problems such as by determining a signal-to-noise ratio on a particular channel, and continuing to monitor the status of the problems on the channel in order to ascertain when the problems are alleviated. FIG. 13 illustrates the merging and splitting of the primary and secondary channels between the startup/shutdown mode and the normal mode with operation mode-based slot assignments. The merged channel may be used by the application as a control channel to request slots on a secondary channel for operation.

Advantages/features of dynamic slot merging and splitting may include the ability to shut-off all the sub-networks on low priority channels in the event that energy within the battery is below a threshold level, or if one of the channels is temporarily unavailable; better robustness in the event of jamming; and better responsiveness. Another advantage/feature of dynamic slot merging and splitting may be that the merged channel can be used when the car is in motion so as to reduce interference from nearby cars in traffic, as not all applications call for permanent slots. For example, seats and doors may not call for permanent slots. Thus, the sensing of a compromise of signal quality, such as sensing the car going into motion and/or sensing an actual decrease in signal quality, may result in the time slots of a particular channel at least temporarily ceasing to be used for communication. Conversely, the sensing of an absence or disappearance of a compromise of signal quality, such as sensing the car stopping or being motionless and/or sensing a return to a higher previous level of signal quality, may result in the time slots of the particular channel once again being used for communication. It is possible that a secondary channel is used only when there is bursty traffic and the application calls for additional slots.

According to at least one embodiment of the present invention, time slots within frequency channels may be assigned to individual sub-networks or functions based on at least one operational characteristic of the sub-networks or functions. As defined herein, an "operational characteristic" may be any characteristic other than a location of a sub-network or any part of a sub-network.

In one embodiment, a wireless protocol for an automotive electrical body system may be provided. In a first operation, at least one body component is provided in a vehicle, such as a car, boat, plane, train, etc. The body component may be anything physical device that may be actuated, heated, or, more generally, caused to undergo any type of transformation. In specific embodiments, the body component is a car seat or a steering wheel. The transformation may be, for example, mechanical, electrical, chemical, or a combination of the above.

In a next operation, a plurality of electrical assemblies are coupled to the at least one body component. Each of the assemblies includes a heating element, a motor, or a switch. In the case of a heating element, the heating element may heat the component, such as the steering wheel or car seat. It is also possible that the heating element may heat some substance in the component, such as to initiate a chemical reaction. In the case of a switch, the switch may turn on or turn off a light. In the case of a motor, the power may be applied to the motor to cause the motor to move some component, or at least some part of the component. For example, the motor may move a steering wheel closer to or farther away from a driver, or may raise or lower the base of the steering wheel. In the case of a car seat, the motor may raise or lower the base of the car seat; move the base of the car seat forward or backward; rotate the back of the car seat in clockwise or counterclockwise directions; lower or raise the head rest; control air ventilation, or control a massage function. In another embodiment, the motor may raise or lower a car door window.

In another operation, a wireless communication module may be connected to the heater or motor. The wireless communication module may receive external wireless signals, such as from another wireless communication module that is connected to a user interface. The user interface may include pushbuttons or switches, and may be installed on a door of the car. For instance, the user may want to apply heat to the steering wheel or seat, or may want to adjust the position of the rearview mirror or seat. Thus, the user may push a button or press a switch, which may cause wireless command signals to be sent to the wireless communication module that is associated with the motor or heating element.

In another operation, in response to the wireless signals, the wireless communication module may control operation of the heating element or motor. That is, the wireless communication module may apply power to, or remove power from, the heating element or motor to thereby apply or remove heat, or adjust a position of the motor. The wireless communication module may receive signals from the Hall sensor of the motor such that a microcontroller of the wireless communication module may determine a current position of the motor.

In another operation, an electrical conductor, such as a power cable, may be used to interconnect each of the electrical assemblies and carry electrical power to each of the electrical assemblies.

Within each time slot, a commanding node may transmit commands, and responding nodes may transmit acknowledgments. Possible protocols for the transmission of these commands and acknowledgments are described in a U.S. patent application filed even date herewith, entitled "Protocol for Wireless Networks", having inventors Thomas Hogenmueller and Vivek Jain, which is hereby incorporated by reference herein in its entirety.

The present invention provides a method for effectively controlling several actuators wirelessly, thereby implementing the desired function. Novel features of the present invention may include function/application based time slotting protocols.

The invention has been described herein as being applicable to body domain systems within automobiles, buses, trucks, etc. However, in other embodiments, the invention is applicable to other domains within a vehicle, such as power train and chassis control, for example.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A wireless transmission method, the method comprising the steps of:
providing a commanding node and a plurality of sub-networks, each of the sub-networks including at least one responding node;
assigning corresponding ones of a plurality of first time slots to individual ones of the sub-networks, the first time slots being disposed within a plurality of frequency channels;
conducting communication between the commanding node and the sub-networks within the assigned first time slots;
sensing a signal quality compromise associated with a first one of the plurality of frequency channels;
in response to the sensing of the signal quality compromise, assigning corresponding ones of a plurality of second time slots to the individual ones of the sub-networks, the second time slots being disposed within a second one of the plurality of frequency channels other than the first one frequency channel associated with the signal quality compromise; and
conducting communication between the commanding node and the sub-networks within the assigned second time slots.

2. The method of claim 1 comprising the further steps of:
sensing an absence of the signal quality compromise associated with the first one of the frequency channels;
in response to the sensing of the absence of the signal quality compromise, re-assigning the corresponding ones of the first time slots to the individual ones of the sub-networks; and
conducting communication between the commanding node and the sub-networks within the first time slots.

3. The method of claim 1 wherein the signal quality compromise comprises a vehicle going into motion, the vehicle carrying the commanding node and the sub-networks.

4. The method of claim 1 wherein the signal quality compromise comprises a decrease in signal quality.

5. A wireless transmission method, the method comprising the steps of:
providing a commanding node and a plurality of sub-networks, each of the sub-networks including at least one responding node;
assigning corresponding ones of a plurality of first time slots to individual ones of the sub-networks, the first time slots being disposed within a plurality of frequency channels;
conducting communication between the commanding node and the sub-networks within the assigned first time slots;
sensing a signal quality compromise associated with a first one of the plurality of frequency channels;
in response to the sensing of the signal quality compromise, assigning corresponding ones of a plurality of second time slots to the individual ones of the sub-networks; and
conducting communication between the commanding node and the sub-networks within the assigned second time slots.

6. The method of claim 5 comprising the further steps of:
sensing an absence of the signal quality compromise associated with the first one of the frequency channels;
in response to the sensing of the absence of the signal quality compromise, re-assigning the corresponding ones of the first time slots to the individual ones of the sub-networks; and
conducting communication between the commanding node and the sub-networks within the first time slots.

7. The method of claim 5 wherein the signal quality compromise comprises a vehicle going into motion, the vehicle carrying the commanding node and the sub-networks.

8. The method of claim 5 wherein the signal quality compromise comprises a decrease in signal quality.

9. The method of claim 5 wherein the second time slots are disposed within a second one of the plurality of frequency channels.

10. A wireless transmission method, the method comprising the steps of:
providing a commanding node and a plurality of sub-networks, each of the sub-networks including at least one responding node;
assigning corresponding ones of a plurality of first time slots to individual ones of the sub-networks, the first time slots being disposed within a plurality of frequency channels;
conducting communication between the commanding node and the sub-networks within the assigned first time slots;
sensing a signal quality compromise associated with a first one of the plurality of frequency channels; and
in response to the sensing of the signal quality compromise, conducting communication between the commanding node and the sub-networks within a plurality of second time slots, the second time slots being disposed within a second one of the plurality of frequency channels other than the first one frequency channel associated with the signal quality compromise.

11. The method of claim 10 wherein the signal quality compromise comprises a vehicle going into motion, the vehicle carrying the commanding node and the sub-networks.

12. The method of claim 10 wherein the signal quality compromise comprises a decrease in signal quality.

13. The method of claim 10 comprising the further step of assigning at least one of the second time slots to the individual ones of the sub-networks.

14. The method of claim 13 comprising the further steps of:
sensing an absence of the signal quality compromise associated with the first one of the frequency channels;
in response to the sensing of the absence of the signal quality compromise, re-assigning the corresponding ones of the first time slots to the individual ones of the sub-networks; and
conducting communication between the commanding node and the sub-networks within the first time slots.

* * * * *